United States Patent

Fleming et al.

[11] Patent Number: 5,850,497
[45] Date of Patent: Dec. 15, 1998

[54] METHOD FOR STRETCHING REFRACTORY BODIES

[75] Inventors: James W. Fleming, Westfield, N.J.; Michael L. Pearsall, Alpharetta, Ga.

[73] Assignee: Lucent Technologies Inc., Murray Hill, N.J.

[21] Appl. No.: 834,264

[22] Filed: Apr. 15, 1997

[51] Int. Cl.⁶ ........................................ G02B 6/02
[52] U.S. Cl. .................. 385/123; 385/141; 385/124; 65/385
[58] Field of Search ................... 385/123–128, 385/141; 65/385, 303, 413, 415, 432, 420, 418

[56] References Cited

U.S. PATENT DOCUMENTS

| | | |
|---|---|---|
| 4,341,441 | 7/1982 | Lighty et al. ......................... 385/123 |
| 4,909,816 | 3/1990 | MacChesney et al. ................. 385/123 |
| 5,320,660 | 6/1994 | Breuls et al. ............................ 65/3.11 |
| 5,444,808 | 8/1995 | Shackleton et al. .................... 385/128 |
| 5,578,106 | 11/1996 | Fleming, Jr. et al. ..................... 65/391 |

*Primary Examiner*—Phan T. H. Palmer

[57] ABSTRACT

A refractory body having reduced optical attenuation, and a method for making same, is disclosed. A refractory body is exposed to a high-temperature oxygen-containing plasma. A drawing force is applied to the body, elongating the body to form a rod of reduced diameter. The source of the plasma is moved in a direction opposite to the applied drawing force, and, preferably, has a reciprocating component of motion to spread the zone of heating. The method is particularly useful in manufacturing optical fiber core rods having low optical attenuation.

22 Claims, 2 Drawing Sheets

METHOD FOR STRETCHING REFRACTORY BODIES

FIELD OF THE INVENTION

The present invention relates to the stretching of refractory bodies.

BACKGROUND OF THE INVENTION

Optical fibers are thin strands of glass or plastic capable of transmitting an optical signal containing a large amount of information over long distances with very low attenuation. Optical fibers can be manufactured by forming an optical core rod preform of appropriate composition and then drawing or stretching the preform to form an optical core rod. The preform is typically drawn by exposing it to the heat of a furnace or oxy-hydrogen torch and applying a drawing force. The core rod is then overcladded.

Heating the core rod preform with an oxy-hydrogen flame imparts OH to the core rod surface and, through diffusion, into the bulk of the core rod. The added OH undesirably increases the optical attenuation of the core rod. While a furnace does not introduce OH into the rod, placing the rod in such a furnace precludes continuous real-time monitoring of the stretching geometry. Accordingly, there is a need for an improved method for forming optical fiber core rods.

SUMMARY OF THE INVENTION

In accordance with the invention, a refractory body is stretched by exposing it to a high-temperature plasma and applying a drawing force. The plasma can be delivered by using a plasma torch. The plasma torch and the refractory body have a non-zero longitudinal relative speed. The relative motion of the plasma torch is in a direction opposite to the applied drawing force. In addition to any overall longitudinal motion, the motion of the torch preferably includes an oscillatory or reciprocating component for increasing the region of the refractory body's exposure to the high-temperature plasma per unit time. This method is particularly useful for drawing down optical core rod preforms to prepare optical core rods for overcladding.

BRIEF DESCRIPTION OF THE DRAWINGS

Further aspects of the invention will become more apparent from the following detailed description of specific embodiments thereof when read in conjunction with the accompanying drawings, in which.

DETAILED DESCRIPTION

Figure 1:
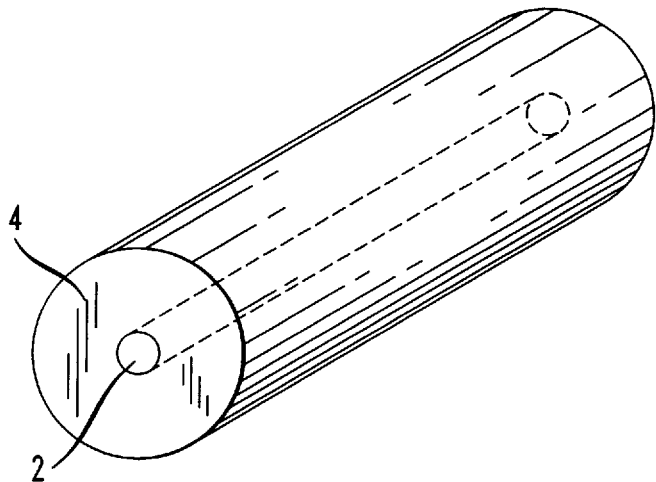
FIG. 1 is an illustration of an optical core rod preform.

The present invention applies to refractory bodies such as, for example, an optical core rod preform, shown in FIG. 1. The core rod preform includes a glass core 2 and a surrounding glass cladding 4. The present process finds particular utility in manufacturing optical core rods from optical core preforms wherein the ratio of the diameter, D, of the outer glass region or cladding to the diameter, d, of the core 2, known as the D/d, is less than about 5. Core rod preforms can be prepared by a variety of methods known to those skilled in the art, such as, for example, vapor-axial-deposition (VAD); outside-vapor-deposition (OVD); modified-chemical vapor deposition (MCVD); and plasma-chemical-vapor-deposition (PCVD). See, for example, Miller & Kaminow (ed.), *Optical Fiber Communications II*, pp. 169–175 (Academic Press 1988).

Figure 2:
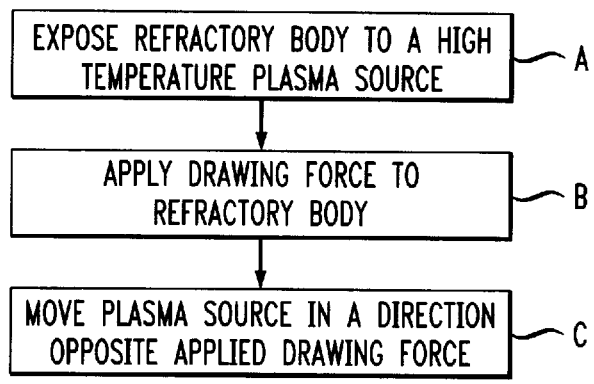
FIG. 2 is a block diagram illustrating an exemplary method for stretching a refractory body.

FIG. 2 is a flow diagram showing the steps of an exemplary embodiment of a process for stretching a refractory body. In block A of FIG. 2, the refractory body is exposed to a high-temperature plasma. The refractory body may be in contact with the plasma fireball, defined herein as that region consisting of the electrically conducting portion of the plasma into which the plasma sustaining electromagnetic energy is coupled, or in other high-temperature regions of the plasma. Typically, the high-temperature plasma will provide a temperature as high as about 9000° C.

Suitable plasma-forming gases include, without limitation, nitrogen, argon, helium, oxygen or mixtures thereof. In preferred embodiments, oxygen is used as the plasma-forming gas. Oxygen concentrations in the range of from about 2 molar percent to 100 percent oxygen are suitable for use in the present invention. If air is used as the plasma-forming gas, it must be moisture free.

In block B, a drawing force is applied to the refractory body so that it is elongated and its diameter is reduced. In block C, the refractory body and the high temperature plasma are moved relative to one another in such a way that the refractory body and the plasma (source) have a non-zero average longitudinal speed. As used herein, longitudinal speed refers to the speed of the refractory body or plasma along an axis parallel to the longest dimension of the refractory body. In preferred embodiments, a reciprocating or oscillatory motion is superimposed on the overall longitudinal motion. The relative motion of the refractory body and a plasma source is illustrated in FIG. 3 and described in more detail below.

Figure 3:
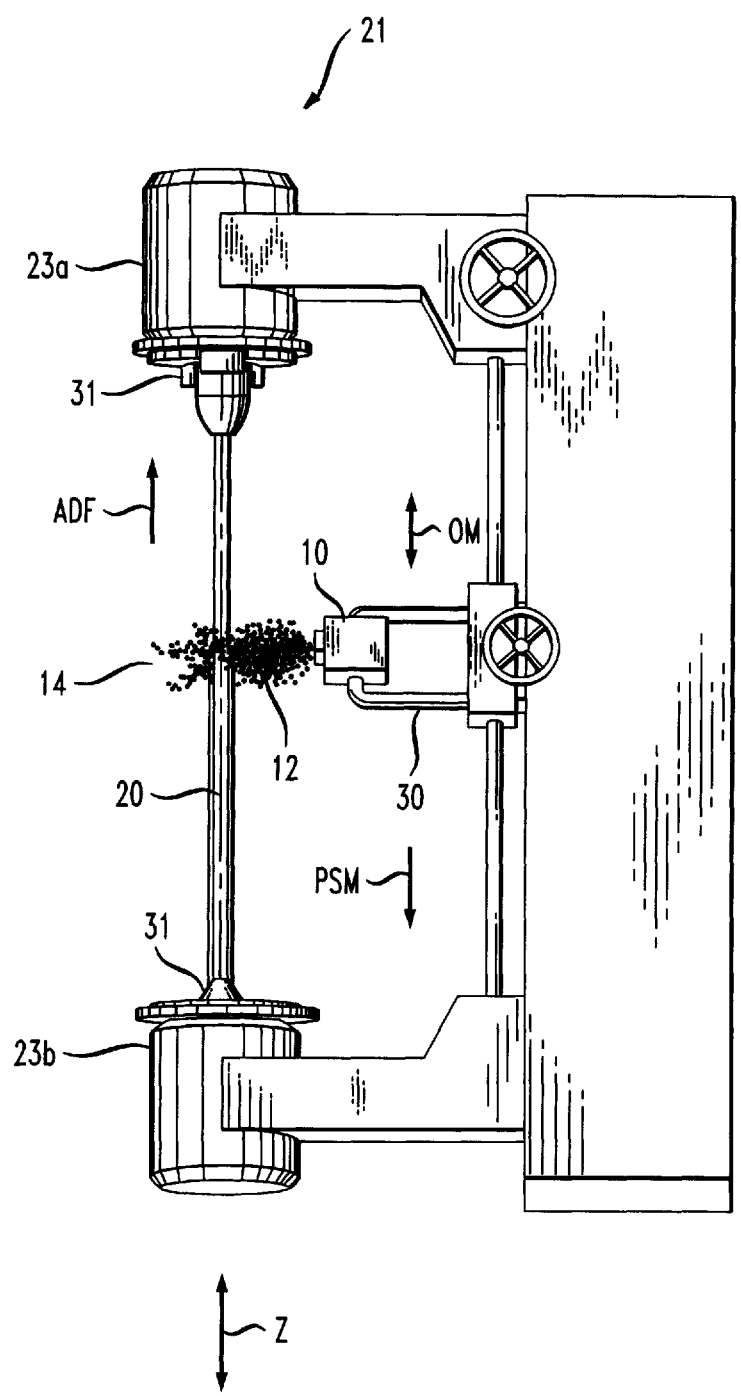
FIG. 3 is a schematic view of preferred apparatus for practicing the method of FIG. 1 in the manufacture of optical fiber core rods.

Referring to FIG. 3, as a refractory body 20 is drawn or stretched from hot-plasma zone 14, its diameter is reduced. The applied drawing force is indicated by vector ADF. The net relative movement of the plasma source 10 is indicated by vector PSM. The direction of the vector PSM is opposite to the direction of the vector ADF. It should be appreciated that as an alternative to moving the plasma source 10 in the direction of the vector PSM, the plasma source can have a fixed position while the refractory body is moved in the direction of the vector PSM (yet drawn in the direction of the vector ADF).

As previously mentioned, in addition to its net movement in the direction of the vector PSM, the plasma source 10 preferably moves back and forth in oscillatory motion OM. Such oscillatory motion OM allows the high-temperature plasma to be applied to a relatively broad section of the refractory body per unit time, thereby extending the hot-plasma zone 14 of the refractory body 20. It will be appreciated that while the specific directions of motion of the refractory body 20 and plasma source 10 are arbitrary, such directions will differ by 180 degrees.

The effect of the aforedescribed process is to heat to a softened state the portion of the refractory body 20 within the amplitude of the reciprocating motion, i.e., the hot-plasma zone 14. Such softening facilitates drawing down the diameter of the refractory body to a desired amount. Unlike certain conventional heat sources, such as an oxy-hydrogen torch, heating with the high temperature plasma source 10 does not add OH to the refractory body.

Moreover, it has been observed that exposure to the high-temperature plasma removes OH from the refractory body. Without limiting the present method to any particular mechanism or theory of operation, it is believed that the high temperature plasma creates a fluidity at the surface of the refractory body that drives off water (OH). Thus, preparing a fiber core rod via the present method results in a lower moisture content, and lower optical attenuation at certain optical wavelengths, than would result from using a furnace or an oxy-hydrogen torch.

The present invention is particularly advantageous for the manufacture of optical fiber cores rods from core rod preforms, wherein such added OH may increase the optical attenuation of the optical core.

With continuing reference to FIG. 3, an apparatus useful in practicing the method of FIG. 2 is illustrated. FIG. 3 shows a refractory body 20, such as a core rod preform, mounted on a controllable speed glass lathe 21. The apparatus is similar to that described in U.S. Pat. No. 5,221,306, which is incorporated herein by reference. A suitable lathe includes the Litton Glass Lathe marketed by Litton Engineering Co.

The lathe 21 includes headstocks 23a and 23b, at least one of which is movable in the Z-direction to apply a drawing force. In preferred embodiments, simultaneously rotating chucks 31 are attached to the headstocks 23a and 23b. Each chuck receives an end of the fiber core rod preform 20. One or more motors are provided to drive the at least one movable headstock 23a or 23b and the rotation of the chucks 31.

The apparatus further includes a high-temperature plasma source 10, such as plasma torch. A plasma torch suitable for use in conjunction with the present invention is described in detail in U.S. Pat. No. 5,000,771, which is incorporated herein by reference. The plasma torch 10 is mounted on a three-axis positioning stage 30. Step motors (not shown) are provided to drive the three axes of the positioning stage 30 controlling the torch's location and transverse speed.

A controller, not shown, such as computer, is provided to coordinate and control the rotation of the core rod preform 20, the movement of the at least one moveable headstock 23a or 23b, and the movement of the torch 10a via the positioning stage 30. Specifically, the controller controls the rotational speed of the core rod preform 20 about the Z-axis, the draw speed of the core rod preform 20 along the Z-axis, and the speed of the torch 10 along the Z-axis. Preferably, the lathe 21 is oriented vertically so that the core rod preform 20 will not sag upon heating.

EXAMPLE

A 33 millimeter (mm) diameter VAD-prepared core rod preform was mounted in a glass working lathe having automated motion of the headstock and a moveable plasma torch. A broad plasma hot zone was created by moving the plasma torch in an oscillatory motion having a frequency of 3 seconds and an amplitude of 6 centimeters (cm). The preform was rotated at 45 rpm. A core rod was drawn from the preform at a rate of about 10 cm per minute (cpm) and the plasma torch had a net speed of about 3 cpm. The diameter of the core rod was reduced to about 11 mm by drawing.

COMPARATIVE EXAMPLE

A 33 mm VAD-prepared core rod preform was mounted in a glass working lathe and heated using a oxy-hydrogen torch. The preform was rotated at 45 rpm, and a core rod was drawn from the preform at a rate of about 10 cpm. The diameter of the core rod preform was reduce to about 11 mm by drawing.

TABLE 1

Optical Attenuation Data for the Example and the Comparative Example

| Wavelength, nm | High Temp. $O_2$ Containing Plasma | | Oxy-Hydrogen Torch | |
|---|---|---|---|---|
| | Run #1 | Run #2 | Run #1 | Run #2 |
| 1310 | 0.329 | 0.328 | 0.332 | 0.338 |
| 1385 | 0.314 | 0.287 | 0.394 | 0.507 |
| 1550 | 0.194 | 0.192 | 0.191 | 0.192 |

Table 1 shows optical attenuation data for the core rod produced from the Example and from the Comparative Example at three industrially-important optical wavelengths. The optical attenuation data is in units of dB per kilometer. Data was obtained for two runs on each sample.

A peak that results from water absorption occurs at 1385 nm. The water contained in the core rod has a significant impact on the optical attenuation of the core rod at that wavelength. The data show an average difference in optical attenuation of 0.15 dB per kilometer between the Example and the Comparative Example. At 1310 nm, the data show an average difference in optical attenuation of 0.01 dB per kilometer between the Example and the Comparative Example. At 1550 nm, the data show an average difference in optical attenuation of 0.002 dB per kilometer, favoring the Comparative Example. The data at 1550 nm showing a minimal difference in optical attenuation are dominated by the effect of the specific winding configuration of the core rod on a spool. It is believed that the data at 1550 nm show no difference in optical attenuation due to moisture content.

The difference in optical attenuation at 1385 nm, 0.15 dB per kilometer favoring the present invention, is a very substantial performance improvement. The difference in optical attenuation at 1310 nm, while only 0.01 dB per kilometer, is still a useful performance improvement.

Thus, in one embodiment, the present invention provides a fiber optic core rod prepared from core rod preforms having a D/d of less than about 5. Such core rods have exceptionally low optical attenuation at 1385 nm. In further embodiments, fiber optic core rods prepared according to the present invention can be overcladded according to well known methods to provide an optical fiber having low optical attenuation.

We claim:

1. A method for drawing a refractory body comprising the steps of:
    exposing a refractory body to a high-temperature plasma;
    applying a drawing force to the refractory body; and
    moving the high-temperature plasma and the refractory body longitudinally relative to one another at a non-zero average rate.

2. The method of claim 1 wherein, in the step of moving, the relative longitudinal motion further comprises a reciprocating component of longitudinal motion.

3. The method of claim 1 wherein the step of exposing further comprises rotating the refractory body about its longitudinal axis.

4. The method of claim 1 wherein the step of moving further comprises moving the high-temperature plasma longitudinally in a direction opposite to the applied drawing force.

5. The method of claim 4 wherein, in the step of moving, the longitudinal motion of the plasma further comprises a reciprocating component of longitudinal motion.

6. The method of claim 1 wherein the high-temperature plasma is supplied by a plasma torch.

7. The method of claim 1 wherein a longitudinal axis of the refractory body has a vertical orientation.

8. The method of claim 1 further comprising the step of forming the refractory body by a method selected from the group consisting of vapor-axial-deposition, outside-vapor-deposition, modified-chemical vapor deposition, and plasma-chemical-vapor-deposition.

9. The method of claim 1 wherein the refractory body is a core rod preform, the core rod preform having a core and a cladding, wherein the ratio of the diameter of the cladding to the diameter of the core is less than about 5.

10. The method of claim 1 wherein the high temperature plasma is formed from a gas selected from the group consisting of nitrogen, argon, helium, oxygen and mixtures thereof.

11. The method of claim 10 wherein the oxygen for forming the plasma is in the range of from about 2 to about 100 mol percent.

12. A method for manufacturing an optical core rod comprising the steps of:
providing a core rod preform having a core and a cladding, wherein the ratio of the diameter of the cladding to the core is less than about 5;
exposing the core rod preform to a high-temperature plasma;
applying a drawing force to the core rod preform; and
moving the high-temperature plasma longitudinally in relation to the core rod preform at a non-zero average rate.

13. The method of claim 12, wherein, in the step of moving, the longitudinal motion of plasma further comprises a reciprocating component of longitudinal motion.

14. The method of claim 12 wherein the step of providing a core rod preform further comprises forming the core rod preform by a method selected from the group consisting of vapor-axial-deposition, outside-vapor-deposition, modified-chemical vapor deposition.

15. The method of claim 12 wherein the step of exposing further comprises rotating the core rod preform about its longitudinal axis.

16. The method of claim 12 wherein a longitudinal axis of the core rod preform has a vertical orientation.

17. The method of claim 12 wherein the optical core rod is characterized by a first refractive index, and further comprising the step of overcladding the optical core rod with glass having a second refractive index that is lower than the first refractive index, the overcladded core forming an optical fiber.

18. A method for forming an optical core rod having low optical attenuation at at least one wavelength, comprising the steps of:
providing a core rod preform having a core and a cladding, wherein the ratio of the diameter of the cladding to the core is less than about 5;
removing moisture from the core rod preform; and
applying a drawing force to the core rod preform, which, when suitably softened, elongates to form an optical core rod.

19. An optical core rod prepared from an optical core rod preform, the optical core rod comprising:
a glass core surrounded by a glass cladding, wherein the ratio of the diameter of the cladding to the diameter of the core is less than about 5, and, wherein,
the moisture content of the optical core rod is sufficiently low so that its optical attenuation is less than about 0.31 dB per kilometer at a wavelength 1385 nanometers.

20. An optical core rod comprising:
a glass core formed by removing moisture from a core rod preform and applying a drawing force thereto; and
a glass cladding surrounding the glass core.

21. The optical core rod of claim 20 wherein moisture is removed by exposing the core rod preform to a high temperature plasma.

22. The optical core rod of claim 21 wherein a sufficient amount of moisture is removed so that the optical attenuation of the optical core rod is less than about 0.31 dB per kilometer at a wavelength 1385 nanometers.

* * * * *